May 26, 1953    E. SCHWARZ    2,639,833
VACUUM SEAL
Filed July 9, 1951

Inventor:
Ernst Schwarz;
By his attorneys
Baldwin + Wight

Patented May 26, 1953

2,639,833

UNITED STATES PATENT OFFICE 2,639,833

VACUUM SEAL

Ernst Schwarz, London, England, assignor to Hilger & Watts Limited, London, England, a company of Great Britain Application July 9, 1951, Serial No. 235,885
In Great Britain April 28, 1950

9 Claims. (Cl. 220—2.3)

The invention relates to vacuum seals and is a further development of the invention described in my patent application Serial No. 81,381 filed March 14, 1949, now Patent No. 2,604,229.

The prior specification discloses a seal for a window of a vacuum vessel in which the window is supported on the periphery of an aperture in the vessel in such a manner as to withstand the stresses due to the vacuum and to permit the window to expand and contract under variations of temperature independently of the vessel, while the actual seal takes the form of a foil of yieldable metal cemented to the outside of the window and to the parts of the vessel immediately surrounding the window.

In the forms of construction described and shown in the drawing of the prior specification the seal of flexible foil is fitted flat on the window near its edge and either flat or with a slight inclination on the surrounding parts of the vessel. It has now been realised that there are some forms of window for which the constructional forms illustrated would not be suitable. For instance, the window may take the form of a hemispherical covering fitted to the end of a cylindrical vessel, or it may be a very thick cover or other lens cover fitted in this manner. In either case a flat seal of the kind previously shown would not be suitable.

It is an object of the present invention to provide the foil of yieldable metal constituting the actual seal in the form of a cylindrical ring fitting the cylindrical outer surface of the vessel and an approximately cylindrical surface of the window. It is a further object to provide a narrow external groove at the joint for the purpose of ensuring that the cement does not run between the contact surfaces of the vessel and the window, and also of leaving a free portion of the foil to allow for differential expansion of the parts. A still further object of the invention is to provide another groove perpendicular to the axis of the vessel by means of which any air or other gas entrapped in the groove under the foil will escape into the vessel and be evacuated during the exhaustion of the vessel.

In making the seal silver chloride is in many cases a suitable cement for attaching the foil to the two members to be sealed together. This material nevertheless has the drawback that it attacks glass, gold and other substances.

It is yet another object of the invention, where silver chloride is to be used as the cement, to burn in a layer of metallic silver onto the surfaces of the members to which the sealing foil is to be attached. The glass or other material is thereby protected from the corrosive action of the silver chloride.

The invention is illustrated in the accompanying drawing, in which.

Figure 1:
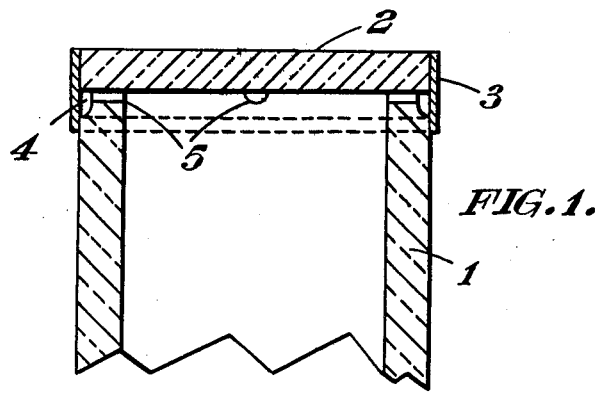
Figure 1 is an axial section on an enlarged scale of part of a glass tube with a thick plate sealed thereto in accordance with the invention.

Referring first to Figure 1, a glass tube 1 is provided with a thick, flat window cover 2, which has to be sealed on so as to be vacuum-tight. The cover 2 is made circular of approximately the same diameter as the outside of the tube. The sealing foil 3 is of cylindrical form to fit the outside diameter of the tube 1 and cover 2, to both of which it is sealed by a suitable cement. A narrow external groove 4 is provided around the outer edge of the tube 1 communicating by radial grooves 5 with the space inside the tube 1. The groove 4 prevents the cement from flowing between the abutting surfaces of the members 1 and 2 and provides a free space of the foil 3 to allow the members 1 and 2 to expand and contract by different amounts under temperature changes. The grooves 5 permit any air or other gas entrapped in the groove 4 to escape into the tube 1, whence it is evacuated during the exhaustion of the tube.

The groove 4 may alternatively be made in the cover 2 or partly in the tube 1 and partly in the cover 2.

Figure 2:
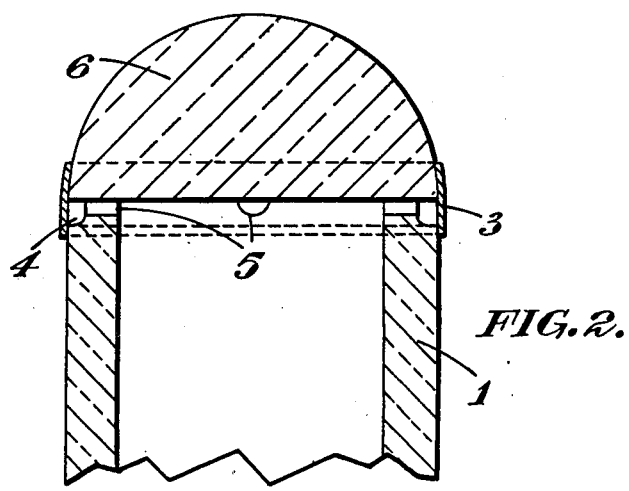
Figure 2 is a similar view in which the cover is in the form of a hemispherical lens.

Figure 2 is similar to Figure 1 but shows the cover 6 in the form of a hemispherical lens. The zone of the cover 6 near the tube 1 is near enough to cylindrical form to support the foil 3 without detriment to the effectiveness of the seal.

Figure 3:
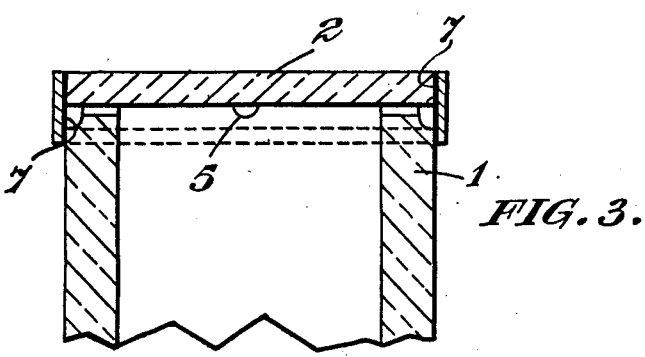
Figure 3 is a view similar to Figure 1 to illustrate the use of a silver coating.

In Figure 3 the surfaces of the tube 1 and cover 2 to which the foil 3 is cemented are provided with a layer 7 of silver burnt in to protect the glass from the corrosive action of silver chloride.

I claim:

1. A closure for a vacuum vessel which has an opening at the end of a tubular part thereof, comprising a cover of substantial thickness and of a diameter approximately equal to the external diameter of the tubular part, said cover being placed on and in contact with the end of the tubular part to close the vessel, and a metal foil of cylindrical shape cemented to the outer surface of the tubular part at the end region thereof and to the outer edge of the cover, a peripheral groove being provided under the metal foil to separate the cemented surfaces of the tubular part and cover, and said groove being in communication with the interior of the vacuum vessel.

2. A closure in accordance with claim 1, in which the peripheral groove is provided entirely in the tubular part of the vacuum vessel, the cover having a completely flat face to make contact with the end of the tubular part of the vessel.

3. A closure in accordance with claim 1, in which the cover is a plate flat on both sides.

4. A closure in accordance with claim 1, in which the cover is a hemispherical lens.

5. A closure for a vacuum vessel which has an opening, comprising a cover to fit over the opening, a silver coating fused to the surface of the vessel in the region of the opening, a silver coating fused to the surface of the cover in the region of the edge thereof, a layer of silver chloride cement on both the said silver coatings, and a silver foil attached both to the vessel and to the cover by the said layers of silver chloride cement.

6. Means for sealing a vacuum vessel comprising a container having an open top, a cover of substantial thickness approximately equal in shape and size to said open top and arranged on and in contact with said open top, said container and said cover comprising a vessel assembly having an external peripheral groove adjacent the line of contact between said cover and said container, and a metal foil cemented to the outer surface of said container and said cover and extending above and below said groove.

7. A device in accordance with claim 6, wherein said vessel assembly is provided with a groove affording communication between said first-named groove and the interior of said container.

8. A closure for a vacuum vessel having an opening at the end of a tubular part thereof, comprising a cover of substantial thickness and of a diameter approximately equal to the external diameter of said tubular part, said cover being arranged on and in contact with the end of said tubular part to close the vessel, said vessel being provided adjacent the end of said tubular part with a relatively narrow, shallow peripheral groove, and a metal foil of cylindrical shape cemented to the outer surface of the tubular part and to the outer edge of the cover, said foil being substantially wider than and extending above and below said groove.

9. A closure in accordance with claim 8, wherein the end of said tubular part is provided with a transverse groove providing permanent communication between said first-named groove and the interior of the vessel.

ERNST SCHWARZ.

References Cited in the file of this patent

UNITED STATES PATENTS

| Number | Name | Date |
|---|---|---|
| 1,686,161 | Liese | Oct. 2, 1928 |
| 2,178,826 | Bowie | Nov. 7, 1939 |
| 2,202,470 | Schedel | May 28, 1940 |
| 2,490,776 | Braunsdorff | Dec. 13, 1949 |